(12) United States Patent
Antony (10) Patent No.: US 9,465,710 B1
(45) Date of Patent: Oct. 11, 2016

(54) SYSTEMS AND METHODS FOR PREDICTIVELY PREPARING RESTORE PACKAGES

(71) Applicant: Symantec Corporation, Mountain View, CA (US)

(72) Inventor: Erica Antony, Blaine, MN (US)

(73) Assignee: Veritas Technologies LLC, Mountain View, CA (US)

( * ) Notice: Subject to any disclaimer, the term of this patent is extended or adjusted under 35 U.S.C. 154(b) by 233 days.

(21) Appl. No.: 13/910,645

(22) Filed: Jun. 5, 2013

(51) Int. Cl.
*G06F 11/00* (2006.01)
*G06F 11/30* (2006.01)

(52) U.S. Cl.
CPC ............................... *G06F 11/3055* (2013.01)

(58) Field of Classification Search
CPC .. G06F 11/008; G06F 11/14; G06F 11/1469; G06F 2201/86; H04L 12/12; H04L 41/0631; H04L 41/0811; H04L 43/0817
See application file for complete search history.

(56) References Cited

U.S. PATENT DOCUMENTS

| | | | | |
|---|---|---|---|---|
| 4,553,213 A * | 11/1985 | Hyatt | | 332/185 |
| 8,707,107 B1 * | 4/2014 | Panna et al. | | 714/47.1 |
| 2002/0183971 A1 * | 12/2002 | Wegerich et al. | | 702/185 |
| 2003/0016462 A1 * | 1/2003 | Gong | | G11B 5/59611 360/31 |
| 2003/0159058 A1 * | 8/2003 | Eguchi | | G06F 3/0622 713/193 |
| 2004/0078171 A1 * | 4/2004 | Wegerich et al. | | 702/188 |
| 2004/0172577 A1 * | 9/2004 | Tan | | G06F 11/1446 714/13 |
| 2005/0216800 A1 * | 9/2005 | Bicknell et al. | | 714/718 |
| 2005/0240813 A1 * | 10/2005 | Okada | | G06F 11/1469 714/14 |
| 2006/0036403 A1 * | 2/2006 | Wegerich et al. | | 702/183 |
| 2006/0212755 A1 * | 9/2006 | Urmanov et al. | | 714/25 |
| 2007/0146189 A1 * | 6/2007 | Wesselink et al. | | 341/155 |
| 2007/0220308 A1 * | 9/2007 | Yeung | | G06F 11/1469 714/5.1 |
| 2009/0216873 A1 * | 8/2009 | Ing et al. | | 709/224 |
| 2011/0185268 A1 * | 7/2011 | Matsushige | | G06F 11/0757 714/819 |
| 2011/0202795 A1 * | 8/2011 | Marathe et al. | | 714/23 |

OTHER PUBLICATIONS

Microsoft, "Microsoft Computer Dictionary 5th Edition" 2002, 5th edition, p. 460-461.*
Symantec Corporation; Symantec Delivers 'Predictive Recovery' for VMware Environments; http://www.dbta. com/Articles/Editorial/News-Flashes/Symantec-Delivers-Predictive-Recovery-for-VMware-Environments-77468.aspx; Sep. 6, 2011 Issue; Database Trends and Applications; as accessed Feb. 7, 2013.

* cited by examiner

*Primary Examiner* — Bryce Bonzo
*Assistant Examiner* — Jeison C Arcos
(74) *Attorney, Agent, or Firm* — ALG Intellectual Property, LLC (57) ABSTRACT

A computer-implemented method for predictively preparing restore packages may include (1) monitoring a computing system for evidence of potential data failures within the computing system, (2) detecting evidence that indicates a potential data failure within the computing system while monitoring the computing system, (3) predicting a scope of the potential data failure based at least in part on the evidence that indicates the potential data failure, and then (4) preparing a restore package configured to restore at least a portion of data implicated by the predicted scope of the potential data failure prior to detecting a request to initiate a restore operation in connection with the potential data failure. Various other methods, systems, and computer-readable media are also disclosed.

20 Claims, 7 Drawing Sheets

Evidence
114

```
**************************************************
SYSTEM SCAN PERFORMED ON: Computing Device 202

SYSTEM SCAN PERFORMED BY: Software Agent 212

RESULT(S) OF SYSTEM SCAN: Management Application appears corrupt

•
                          •
                          •

TIMESTAMP: 06/15/2013 01:30:04 AM

**************************************************
```

Restore Package
116

```
**************************************************
RESTORE PACKAGE FOR: Computing Device 202

RESTORE PACKAGE DERIVED FROM: Backup Image 208(1)

DATA TO BE RESTORED: Management Application

•
                          •
                          •

TIMESTAMP: 06/15/2013 02:50:01 AM

SYSTEMS AND METHODS FOR PREDICTIVELY PREPARING RESTORE PACKAGES

BACKGROUND

Backup and restore technologies are often used to prevent (or at least mitigate) data loss in the event of a disaster or system failure. For example, a corporation may use a backup and restore technology to back up computing systems included in the corporation's internal network. In this example, the corporation may rely on the backup and restore technology to restore a computing system to a previous computing state in the event that at least a portion of the computing system's data becomes corrupt.

However, while conventional backup and restore technologies may facilitate restoring computing systems to previous computing states, such backup and restore technologies may have certain shortcomings and/or inefficiencies that negatively impact performance. For example, the corporation's backup and restore technology may need a significant amount of time to develop a restore package and then restore the computing system from the restore package after receiving a restore request from the system's user. In the meantime, the corporation may be unable to perform certain computing tasks assigned to the computing system. Unfortunately, this inability to perform such tasks may temporarily impair the corporation's business operations.

What is needed, therefore, are systems and methods for reducing the amount of time needed to restore computing systems by predictively preparing restore packages in anticipation of receiving requests to restore the computing systems.

SUMMARY

As will be described in greater detail below, the instant disclosure generally relates to systems and methods for predictively preparing restore packages by monitoring computing systems for evidence of potential data failures and preparing restore packages based at least in part on such evidence.

In one example, a computer-implemented method for predictively preparing restore packages may include (1) monitoring a computing system for evidence of potential data failures within the computing system, (2) detecting evidence that indicates a potential data failure within the computing system while monitoring the computing system, (3) predicting a scope of the potential data failure based at least in part on the evidence that indicates the potential data failure, and then (4) preparing a restore package configured to restore at least a portion of data implicated by the predicted scope of the potential data failure prior to detecting a request to initiate a restore operation in connection with the potential data failure.

In some examples, the method may also include detecting the request to initiate the restore operation in connection with the potential data failure. In such examples, the method may further include immediately initiating the restore operation to facilitate restoring the portion of data implicated by the predicted scope of the potential data failure. Additionally or alternatively, the method may include immediately providing the restore package to the computing system to enable the computing system to launch the restore package.

In some examples, the method may also include maintaining the restore package in anticipation of detecting the request to initiate the restore operation. Additionally or alternatively, the method may include facilitating launching the restore package without having to prepare the restore package in response to detecting the request to initiate the restore operation.

In some examples, the method may also include analyzing the evidence that indicates the potential data failure within the computing system. In such examples, the method may further include identifying at least one backup image of the computing system that includes the portion of data based at least in part on analyzing the evidence that indicates the potential data failure. Additionally or alternatively, the method may include preparing the restore package based at least in part on the backup image of the computing system that includes the portion of data.

In one example, the method may include configuring the restore package to facilitate restoring the computing system to a previous computing state captured in the backup image. In another example, the method may include configuring the restore package to facilitate restoring a subset of the data captured in the backup image.

Additionally or alternatively, the method may include configuring the restore package based at least in part on at least one industry trend or best practice technique. For example, the method may include identifying a location allocated to store the portion of data implicated by the potential data failure within the computing system. In this example, the method may further include configuring the restore package to restore the portion of data implicated by the potential data failure to a different location within the computing system.

In some examples, the method may also include directing a software agent installed on the computing system to monitor the computing system for evidence of potential data failures. In one example, the method may include detecting evidence of at least one corrupt application installed on the computing system. In another example, the method may include determining that the computing system is offline.

In one embodiment, a system for implementing the above-described method may include (1) a monitoring module that (a) monitors a computing system for evidence of potential data failures within the computing system and (b) detects evidence that indicates a potential data failure within the computing system while monitoring the computing system, (2) a prediction module that predicts a scope of the potential data failure based at least in part on the evidence that indicates the potential data failure, and (3) a preparation module that prepares a restore package configured to restore at least a portion of data implicated by the predicted scope of the potential data failure prior to detecting a request to initiate a restore operation in connection with the potential data failure. The system may also include at least one processor configured to execute the monitoring module, the prediction module, and the preparation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) monitor a computing system for evidence of potential data failures within the computing system, (2) detect evidence that indicates a potential data failure within the computing system while monitoring the computing system, (3) predict a scope of the potential data failure based at least in part on the evidence that indicates the potential data failure, and then (4) prepare a restore package configured to restore at least a portion of data implicated by the predicted scope of the potential data failure prior to detecting a request to initiate a restore operation in connection with the potential data failure.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for predictively preparing restore packages. As will be explained in greater detail below, by monitoring a computing system for evidence of potential data failures, the various systems and methods described herein may detect a potential data failure within the computing system even before a user of the computing system initiates a request to restore the computing system. By detecting the potential data failure even before the user of the computing system initiates a request to restore the computing system, the various systems and methods described herein may prepare a restore package configured to restore computing system and then maintain the restore package in anticipation of receiving a request to restore the computing system. Moreover, by maintaining the restore package in anticipation of receiving a request to restore the computing system, the various systems and methods described herein may reduce the amount of time needed to restore the computing system since the restore package is prepared prior to receiving a request to restore the computing system.

Figure 1:
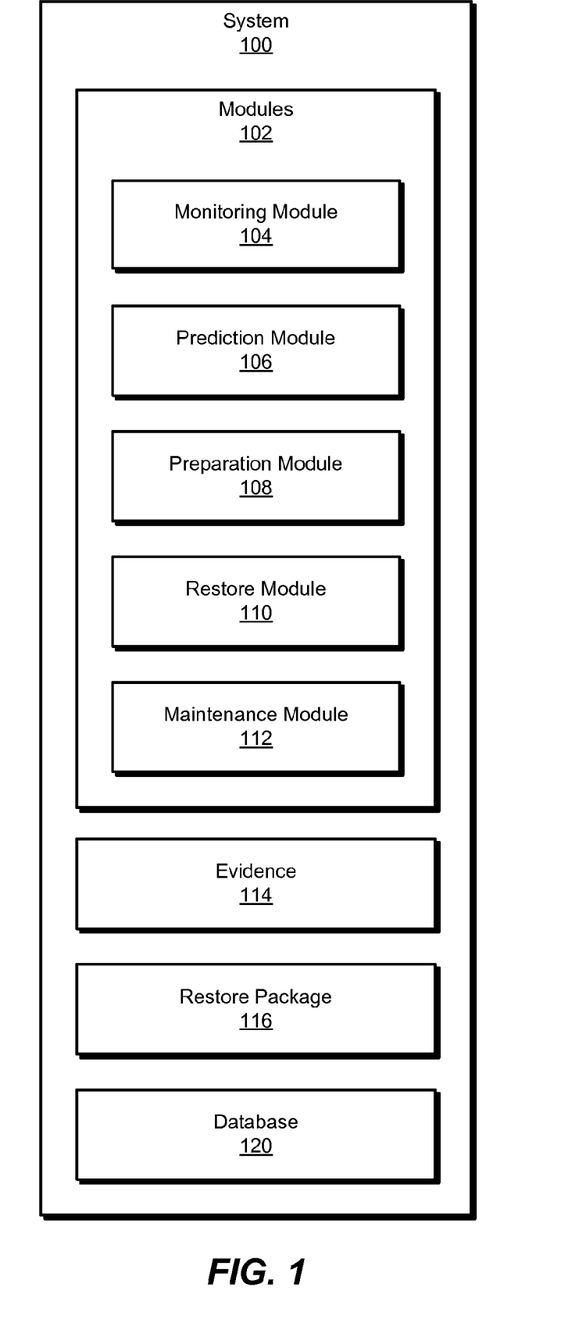
FIG. 1 is a block diagram of an exemplary system for predictively preparing restore packages.
Figure 2:
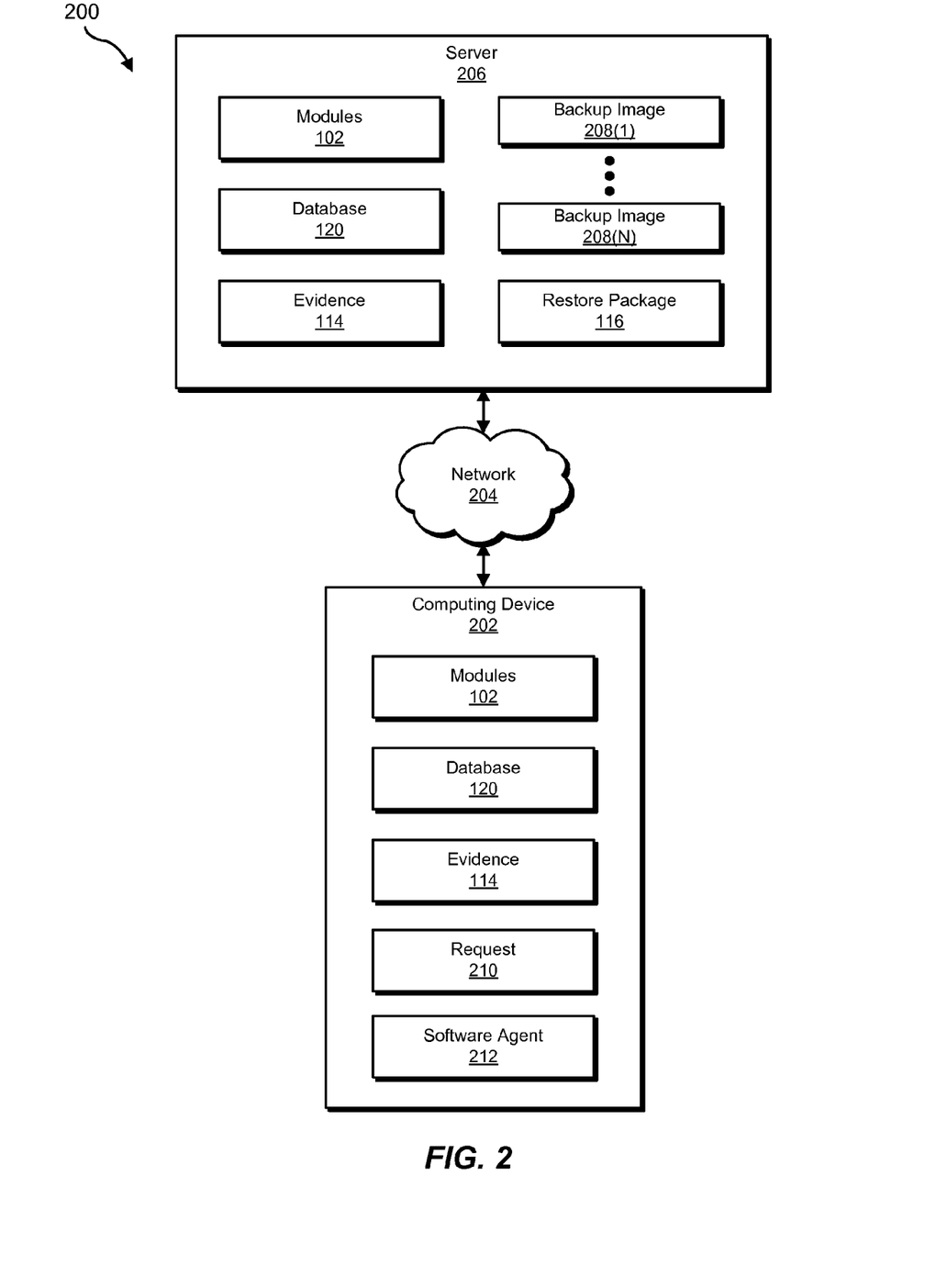
FIG. 2 is a block diagram of an exemplary system for predictively preparing restore packages.

The following will provide, with reference to FIGS. 1-2, detailed descriptions of exemplary systems for predictively preparing restore packages. Detailed descriptions of corresponding computer-implemented methods will be provided in connection with FIG. 3. Detailed descriptions of exemplary evidence of a potential data failure and an exemplary restore package will be provided in connection with FIG. 4. Detailed descriptions of an exemplary request to initiate a restore operation will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for predictively preparing restore packages. As illustrated in this figure, exemplary system 100 may include one or more modules 102 for performing one or more tasks. For example, and as will be explained in greater detail below, exemplary system 100 may include a monitoring module 104 that (1) monitors a computing system for evidence of potential data failures within the computing system and (2) detects evidence that indicates a potential data failure within the computing system while monitoring the computing system. Exemplary system 100 may also include a prediction module 106 that predicts a scope of the potential data failure based at least in part on the evidence that indicates the potential data failure.

In addition, and as will be described in greater detail below, exemplary system 100 may include a preparation module 108 that prepares a restore package configured to restore at least a portion of data implicated by the predicted scope of the potential data failure prior to detecting a request to initiate a restore operation in connection with the potential data failure. Exemplary system 100 may also include a restore module 110 that (1) detects the request to initiate the restore operation in connection with the potential data failure and (2) immediately initiates the restore operation to facilitate restoring the portion of data implicated by the predicted scope of the potential data failure in response to detecting the request to initiate the restore operation.

Moreover, and as will be described in greater detail below, exemplary system 100 may include a maintenance module 112 that maintains the restore package in anticipation of the request to initiate the restore operation. Although illustrated as separate elements, one or more of modules 102 in FIG. 1 may represent portions of a single module or application (such as SYMANTEC NETBACKUP, SYMANTEC BACKUP EXEC, or SYMANTEC SYSTEM RECOVERY).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include various evidence of a potential data failure, such as evidence 114. The term "evidence," as used herein, generally refers to any type or form of activity, behavior, occurrence, observation, data, and/or information that indicates or suggests that a failure has occurred or may potentially occur at a future point in time. In one example, evidence 114 may include one or more errors (such as one or more run-time errors) detected during and/or after execution of a software application installed on a computing device, such as a device illustrated in FIG. 2 (e.g., computing device 202 or server 206), computing system 610 in FIG. 6, and/or a portion of exemplary network architecture 700 in FIG. 7. In another example, evidence 114 may include a failed attempt to access and/or communicate with a computing device, such as a device illustrated in FIG. 2 (e.g., computing device 202 or server 206), computing system 610 in FIG. 6, and/or a portion of exemplary network architecture 700 in FIG. 7.

As illustrated in FIG. 1, exemplary system 100 may also include one or more restore packages, such as restore package 116. The phrase "restore package," as used herein, generally refers to any type or form of file or image used to restore at least a portion of data implicated by a potential data failure. Restore package 116 may include any particular level of granularity of data used to restore a computing device. For example, restore package 116 may include an entire backup image (such as at least one of backup images 208(1)-(N) in FIG. 2) that represents a previous computing state of a computing device, such as a device illustrated in FIG. 2 (e.g., computing device 202 or server 206), computing system 610 in FIG. 6, and/or a portion of exemplary network architecture 700 in FIG. 7. In another example, restore package 116 may include a subset of a backup image (e.g., a single file or folder captured in at least one of backup images 208(1)-(N) in FIG. 2) that represents a previous computing state of a computing device, such as a device illustrated in FIG. 2 (e.g., computing device 202 or server 206), computing system 610 in FIG. 6, and/or a portion of exemplary network architecture 700 in FIG. 7.

As illustrated in FIG. 1, exemplary system 100 may also include one or more databases, such as database 120. In some examples, database 120 may be configured to store various data and/or information used to predictively prepare restore packages. For example, database 120 may store one or more file systems, folders, and/or files monitored for evidence of potential data failures. In this example, database 120 may also store one or more software applications configured to run on one or more computing devices, such as one or more of the devices illustrated in FIG. 2 (e.g., computing device 202 and/or server 206), computing system 610 in FIG. 6, and/or one or more portions of exemplary network architecture 700 in FIG. 7.

Database 120 may represent portions of a single database or computing device or a plurality of databases or computing devices. For example, database 120 may represent a portion of one or more of the devices illustrated in FIG. 2 (e.g., computing device 202 and/or server 206), computing system 610 in FIG. 6, and/or one or more portions of exemplary network architecture 700 in FIG. 7. Additionally or alternatively, database 120 in FIG. 1 may represent one or more physically separate devices capable of being accessed by one or more of the devices illustrated in FIG. 2 (e.g., computing device 202 and/or server 206), computing system 610 in FIG. 6, and/or one or more portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

Computing device 202 may include one or more of modules 102, at least a portion of database 120, at least a portion of evidence 114, a request 210, and/or a software agent 212. In one example, software agent 212 may be configured to monitor computing device 202 for evidence of potential data failures. In this example, request 210 may be configured to initiate a restore operation after a user of computing device 202 notices that computing device 202 has experienced a potential data failure.

Additionally or alternatively, server 206 may include one or more of modules 102, at least a portion of database 120, at least a portion of evidence 114, restore package 116, and/or backup images 208(1)-(N). The phrase "backup image," as used herein, generally refers to any type or form of file that includes a complete or partial copy of the contents and/or data located on a computing or storage device at a particular point in time. Backup images 208(1)-(N) may represent any portion of a backup technology vendor's backup catalog, including, e.g., data that has been backed up to a primary storage facility and/or one or more replicated copies of at least a portion of the data backed up to the primary storage facility. Examples of backup images 208(1)-(N) include, without limitation, full backup images, incremental backup images, differential backup images, deduplicated backup images, replicated copies of backup images or data, snapshots, combinations of one or more of the same, or any other suitable backup images.

In one example, each of backup images 208(1)-(N) may represent a computing state of computing device 202 captured at a previous point in time. In this example, each of backup images 208(1)-(N) may include one or more files and/or data located on computing device 202 at the corresponding point in time.

In one embodiment, one or more of modules 102 from FIG. 1 may, when executed by at least one processor of computing device 202 and/or server 206, facilitate computing device 202 and/or server 206 in predictively preparing restore packages. For example, and as will be described in greater detail below, one or more of modules 102 may cause computing device 202 and/or server 206 to (1) monitor computing device 202 for evidence of potential data failures within computing device 202, (2) detect evidence 114 that indicates a potential data failure within computing device 202 while monitoring computing device 202, (3) predict a scope of the potential data failure based at least in part on evidence 114, and then (4) prepare restore package 116 configured to restore at least a portion of data implicated by the predicted scope of the potential data failure prior to detecting request 210 to initiate a restore operation in connection with the potential data failure.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device. In one embodiment, computing device 202 may include one or more internal or external storage devices (not illustrated in FIG. 2).

Server 206 generally represents any type or form of computing device capable of preparing restore packages configured to restore at least a portion of data implicated by a potential data failure. Examples of server 206 include, without limitation, application servers, web servers, storage servers, and/or database servers configured to run certain software applications and/or provide various web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
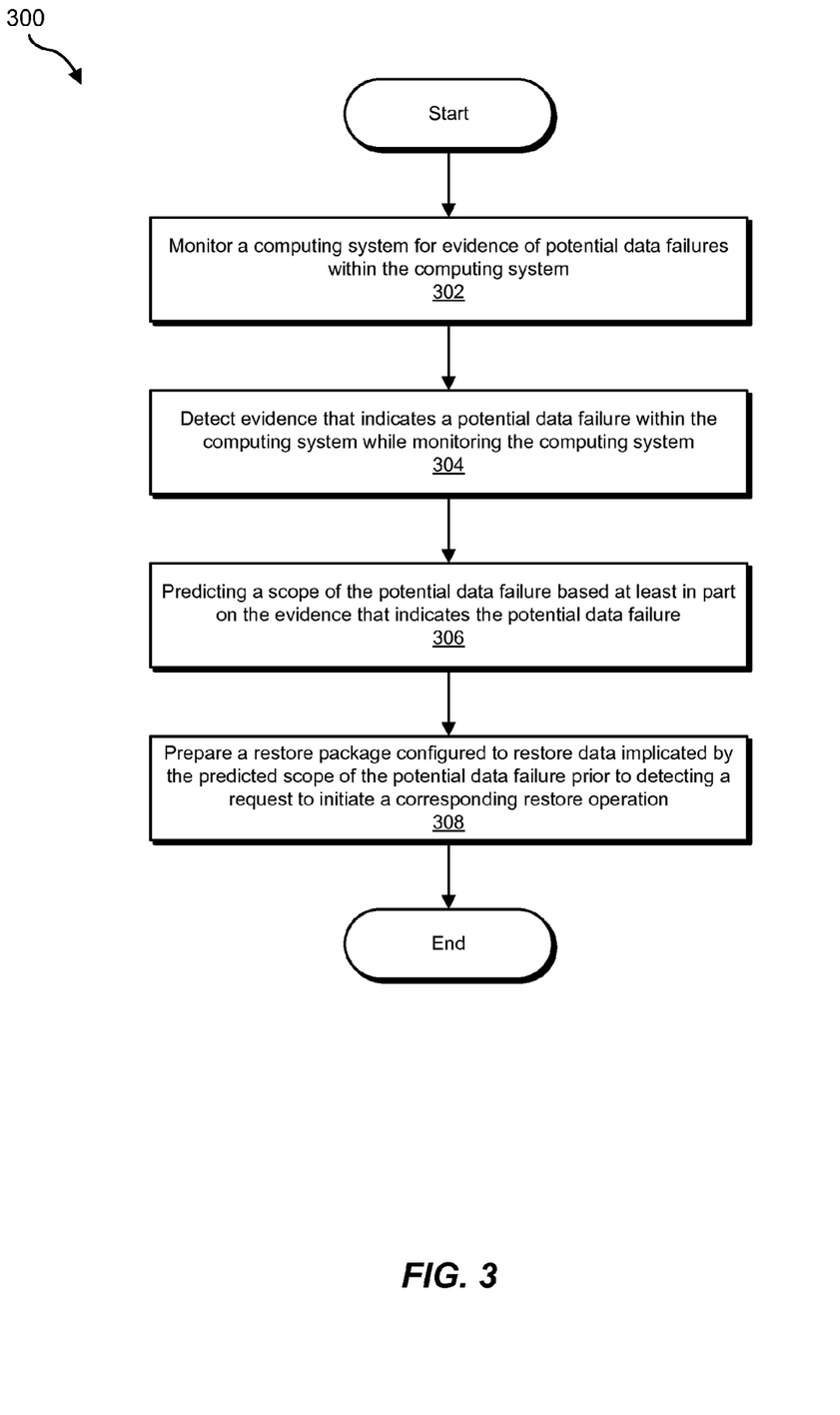
FIG. 3 is a flow diagram of an exemplary method for predictively preparing restore packages.

FIG. 3 is a flow diagram of an exemplary computer-implemented method 300 for predictively preparing restore packages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may monitor a computing system for evidence of potential data failures within the computing system. For example, at step 302 monitoring module 104 may, as part of computing device 202 and/or server 206 in FIG. 2, monitor computing device 202 for evidence of potential data failures within computing device 202. Examples of such evidence of potential data failures include, without limitation, errors (e.g., run-time and/or exception-handling errors), failed attempts to access data, non-matching checksums, system or application crashes, system or application freezes, non-responsive systems or applications, absence of expected data, inability to communicate with remote systems, malware infections, variations in operating speeds, combinations of one or more of the same, and/or any other suitable evidence of potential data failures.

The systems described herein may perform step 302 in a variety of ways. In one example, monitoring module 104 may direct software agent 212 to scan computing device 202 for evidence of potential data failures on a periodic basis. For example, monitoring module 104 may configure software agent 212 to perform a system scan on computing device 202 every day at 1:00:00 AM (which corresponds to [hours]:[minutes]:[seconds] [12-hour clock indicator]). In this example, during each system scan, software agent 212 may search computing device 202 for evidence of potential data failures.

In some examples, monitoring module 104 may direct software agent 212 to scan computing device 202 for evidence of potential data failures in response to an event or occurrence. For example, monitoring module 104 may check an event log associated with an operating system installed on computing device 202 to determine whether the operating system has reported a particular error indicative of a potential data failure. In this example, upon checking the event log, monitoring module 104 may determine that the operating system has reported the particular error as having occurred on computing device 202. Monitoring module 104 may then initiate a full system scan on computing device 202 in response to determining that the operating system has reported the particular error as having occurred on computing device 202.

In some examples, monitoring module 104 may collect one or more results of the system scan performed by software agent 212 on computing device 202. In one example, monitoring module 104 may maintain at least a portion of the results on computing device 202. In this example, by maintaining the portion of the results on computing device 202, monitoring module 104 may enable computing device 202 to analyze the portion of the results and detect evidence that indicates a potential data failure within computing device 202 based at least in part on the portion of the results.

In another example, monitoring module 104 may direct computing device 202 to provide at least a portion of the results to server 206 via network 204. In this example, by directing computing device 202 to provide the portion of the results to server 206, monitoring module 104 may enable server 206 to analyze the portion of the results and detect evidence that indicates a potential data failure within computing device 202 based at least in part on the portion of the results.

In one example, monitoring module 104 may, as part of computing device 202, locally monitor computing device 202 for evidence of potential data failures. Additionally or alternatively, monitoring module 104 may, as a part of server 206, remotely monitor computing device 202 for evidence of potential data failures.

As illustrated in FIG. 3, at step 304 one or more of the systems described herein may detect evidence that indicates a potential data failure within the computing system while monitoring the computing system. For example, at step 304 monitoring module 104 may, as part of computing device 202 and/or server 206 in FIG. 2, detect evidence 114 that indicates a potential data failure within computing device 202 while monitoring computing device 202. Examples of the potential data failure include, without limitation, one or more corrupt applications, corrupt file systems, corrupt files, system failures, communication failures, storage failures, input/output failures, processing failures, failures to access a particular computing device, combinations of one or more of the same, and/or any other type or form of potential data failure.

The systems described herein may perform step 304 in a variety of ways. In some examples, monitoring module 104 may analyze one or more of the results of the system scan while performing the system scan on computing device 202. For example, while performing the system scan on computing device 202, monitoring module 104 may detect a run-time error [100] (where "[100]" identifies the code corresponding to the particular run-time error) that occurred in connection with a management application installed on computing device 202. In this example, upon detecting the run-time error [100], monitoring module 104 may determine that the run-time error [100] indicates or suggests that a potential data failure has occurred within computing device 202. Monitoring module 104 may then record this run-time error [100] as part of evidence 114.

Additionally or alternatively, monitoring module 104 may analyze one or more of the results of the system scan upon completion of the system scan. For example, while performing the system scan on computing device 202, monitoring module 104 may compile a list of various observations made during the system scan. In this example, monitoring module 104 may add the run-time error [100] that occurred in connection with the management application installed on computing device 202 to the list of observations made during the system scan. Upon completing the system scan, monitoring module 104 may analyze the list of observations made during the system scan and determine that the run-time error [100] indicates or suggests that a potential data failure has occurred within computing device 202. Monitoring module 104 may then record this run-time error [100] as part of evidence 114.

Figure 4:
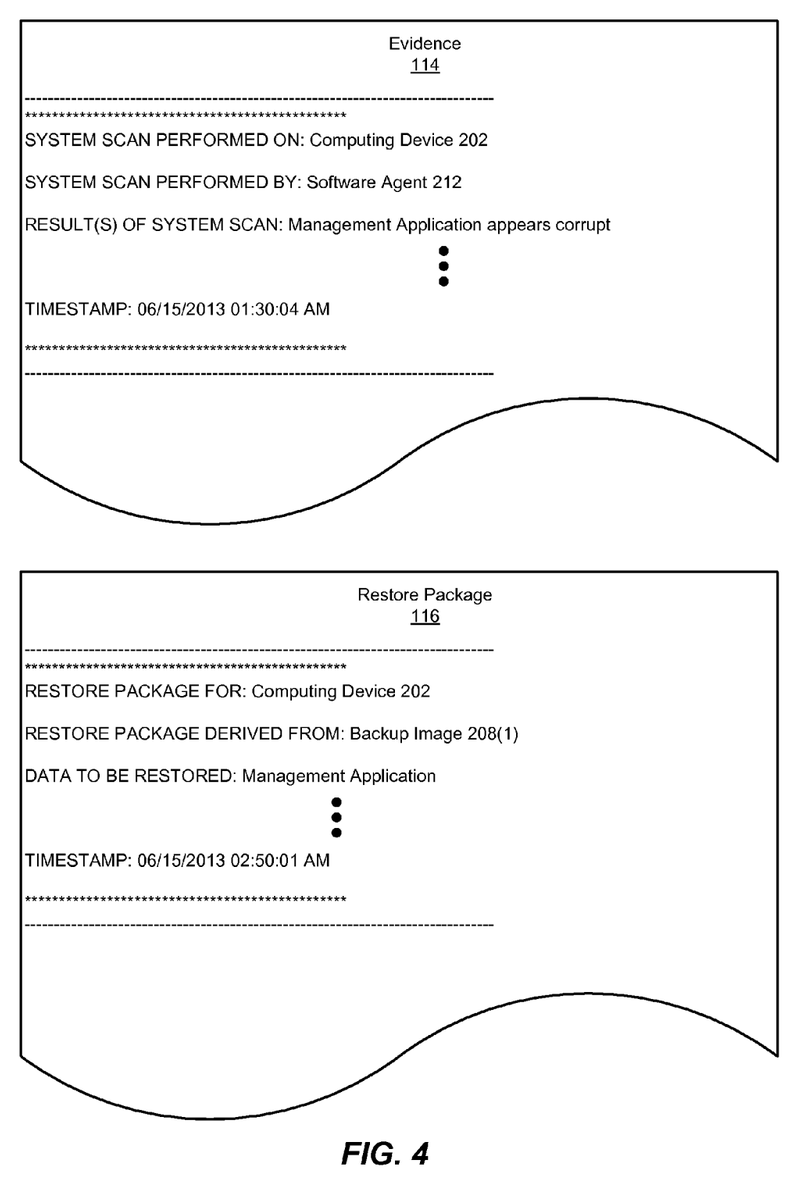
FIG. 4 is an illustration of exemplary evidence of a potential data failure and an exemplary restore package.

As illustrated in FIG. 4, evidence 114 may include information that identifies the system on which the system scan was performed (in this example, "Computing Device 202"), the application that performed the system scan (in this example, "Software Agent 212"), the results of the system scan (in this example, "Run-time error [100] detected in connection with Management Application," etc.), and a timestamp that identifies when the evidence was compiled from the results of the system scan (in this example, "06/15/2013" at "01:30:04 AM").

Using evidence 114 illustrated in FIG. 4 as an example, monitoring module 104 may start performing a system scan on computing device 202 at 1:00:00 AM on Jun. 15, 2013. While performing the system scan, monitoring module 104 may observe various activities, behaviors, occurrences, data, and/or information that are potentially indicative of one or more data failures within computing device 202. For example, while performing the system scan, monitoring module 104 may detect the run-time error [100] that occurred in connection with the management application installed on computing device 202. Monitoring module 104 may identify these observations as evidence 114 indicating a potential data failure within computing device 202. Monitoring module 104 may then mark evidence 114 with a timestamp that identifies 1:30:04 AM on Jun. 15, 2013 as the point in time that evidence 114 was compiled from the results of the system scan.

In one example, monitoring module 104 may, as part of computing device 202, detect at least a portion of evidence 114 that indicates the potential data failure within computing device 202. Additionally or alternatively, monitoring module 104 may, as a part of server 206, detect at least a portion of evidence 114 that indicates the potential data failure within computing device 202.

As illustrated in FIG. 3, at step 306 one or more of the systems described herein may predict the scope of the potential data failure based at least in part on the evidence that indicates the potential data failure. For example, at step 306 prediction module 106 may, as part of computing device 202 and/or server 206 in FIG. 2, predict the scope of the potential data failure based at least in part on evidence 114. In this example, prediction module 106 may initiate the process of predicting the scope of the potential data failure in response to the detection of evidence 114. The term "scope," as used herein, generally refers to the extent or degree (as, e.g., defined by one or more boundaries or limits) to which a potential data failure has likely affected and/or implicated data located on a computing or storage device.

The systems described herein may perform step 306 in a variety of ways. In some examples, prediction module 106 may analyze evidence 114 to determine the scope of the potential data failure. In one example, prediction module 106 may search evidence 114 in FIG. 4 for one or more clues as to which data located on computing device 202 has been affected and/or implicated by the potential data failure. For example, while searching evidence 114 in FIG. 4, prediction module 106 may identify the run-time error [100] detected in connection with the management application installed on computing device 202. Prediction module 106 may then determine that this run-time error [100] identified in evidence 114 in FIG. 4 indicates or suggests that the management application has become corrupt.

Additionally or alternatively, prediction module 106 may identify at least one result of the system scan that indicates or suggests that other data located on computing device 202 has been affected and/or implicated by the potential data failure. For example, while searching evidence 114, prediction module 106 may identify an error (not illustrated in FIG. 4) that resulted from at least one failed attempt to access a particular file within a file system of computing device 202. Prediction module 106 may then determine that this error identified in evidence 114 indicates or suggests that the file within the file system has become corrupt.

Continuing with this example, prediction module 106 may also determine that the entire file system that includes the file has become corrupt. For example, while searching evidence 114, prediction module 106 may identify various other errors (not illustrated in FIG. 4) that resulted from failed attempts to access various files within the file system of computing device 202. In this example, prediction module 106 may determine that the number of errors resulting from these failed attempts exceeds a predetermined threshold indicative or suggestive of a file system failure. Prediction module 106 may then determine that the entire file system has become corrupt since the number of errors resulting from these failed attempts exceeds the predetermined threshold.

Additionally or alternatively, while searching evidence 114, prediction module 106 may identify one or more specific errors (not illustrated in FIG. 4) that indicate or suggest a file system failure. Prediction module 106 may then determine that the entire file system has become corrupt based at least in part on the specific errors identified in evidence 114.

In one example, prediction module 106 may determine that the potential data failure implicates all of the data located on computing device 202. For example, while searching evidence 114, prediction module 106 may identify an error (not illustrated in FIG. 4) that resulted from at least one failed attempt to access or communicate with computing device 202. Prediction module 106 may then determine that this error identified in evidence 114 indicates or suggests that computing device 202 is completely down or offline (due, e.g., to a disaster or severe system failure).

In some examples, prediction module 106 may be configured to predict the scope of the potential data failure based at least in part on one or more predefined parameters. For example, prediction module 106 may be configured to define the scope of the potential data failure as including any application that, when executed, causes a run-time error [100] to occur within computing device 202. In this example, since evidence 114 in FIG. 4 identifies the run-time error [100] detected in connection with the management application installed on computing device 202, prediction module 106 may define the scope of the potential data failure as including the management application.

As illustrated in FIG. 3, at step 308 one or more of the systems described herein may prepare a restore package configured to restore at least a portion of data implicated by the predicted scope of the potential data failure prior to detecting a request to initiate a restore operation in connection with the potential data failure. For example, at step 308 preparation module 108 may, as part of server 206 in FIG. 2, prepare restore package 116 configured to restore at least a portion of data implicated by the predicted scope of the potential data failure prior to detecting a request to initiate a restore operation in connection with the potential data failure. In this example, preparation module 108 may initiate the process of preparing restore package 116 in response to the detection of evidence 114.

The systems described herein may perform step 308 in a variety of ways. In one example, preparation module 108 may identify at least one backup image of computing device 202 that includes the portion of data implicated by the predicted scope of the potential data failure. For example, preparation module 108 may search backup images 208(1)-(N) of computing device 202 for a backup image that includes the management application that has become corrupt on computing device 202. In this example, while searching backup images 208(1)-(N) of computing device 202, preparation module 108 may determine that backup image 208(1) includes the management application that has become corrupt on computing device 202. Preparation module 108 may then prepare restore package 116 based at least in part on backup image 208(1).

As illustrated in FIG. 4, restore package 116 may include information that identifies the device for which the restore package was prepared (in this example, "Computing Device 202"), the backup image from which the restore package was derived (in this example, "Backup Image 208(1)"), the portion of data to be restored by the restore package (in this example, "Management Application," etc.), and a timestamp that identifies when restore package 116 was prepared for the computing device (in this example, "06/15/2013" at "2:50:01 AM").

In one example, preparation module 108 may configure restore package 116 to facilitate restoring computing device 202 to the previous computing state captured in backup image 208(1). For example, in the event that the scope of the potential data failure implicates all of the data located on computing device 202, preparation module 108 may configure restore package 116 to include all of the data (e.g., each file system, folder, application, and file) that was located on computing device 202 at the previous point in time corresponding to backup image 208(1). By configuring restore package 116 to include all of that data, preparation module 108 may enable computing device 202 to revert back to the computing state experienced by computing device 202 at the previous point in time.

In another example, preparation module 108 may configure restore package 116 to facilitate restoring only a subset of the data captured in backup image 208(1). For example, in the event that the scope of the potential data failure implicates only the management application installed on computing device 202, preparation module 108 may configure restore package 116 to include only the management application captured in backup image 208(1). By configuring restore package 116 to include only the management application captured in backup image 208(1), preparation module 108 may enable computing device 202 to restore the management application without disturbing the other data that remained unaffected by the potential data failure.

In some examples, preparation module 108 may take into account one or more environmental considerations when determining how to prepare and/or configure restore package 116. Examples of these environmental considerations include, without limitation, the most recent backup image of the computing device, the backup image that represents the closest and/or fastest recovery point for the computing device, the capacity and/or availability of one or more storage devices accessible to the computing device, and/or any other suitable environmental considerations.

In one example, preparation module 108 may determine that various backup images within backup images 208(1)-(N) include the management application that has become corrupt on computing device 202. In this example, preparation module 108 may search backup images 208(1)-(N) for the most recently captured backup image that includes the management application. While searching backup images 208(1)-(N), preparation module 108 may determine that backup image 208(1) is the most recently captured backup image that includes the management application. Preparation module 108 may retrieve the management application from backup image 208(1) since backup image 208(1) is the most recent and then incorporate the management application into restore package 116.

In one example, preparation module 108 may configure a restore package to include the management application captured in backup image 208(1) and at least a portion of data captured in backup image 208(N). For example, preparation module 108 may search backup images 208(1)-(N) for the management application and another application (not illustrated in FIG. 4) implicated by the scope of the potential data failure. In this example, while searching backup images 208(1)-(N), preparation module 108 may determine that backup image 208(1) is the most recently captured backup image that includes the management application and backup image 208(N) is the most recently captured backup image that includes the other application (e.g., in the event that backup image 208(1) represents a differential or incremental backup image and backup image 208(N) represents a full backup image). Preparation module 108 may retrieve the management application from backup image 208(1) and the other application from backup image 208(N) and then incorporate the management application and the other application into the restore package.

In some examples, preparation module 108 may take into account one or more industry trends and/or best practice techniques when determining how to prepare and/or configure restore package 116. For example, preparation module 108 may identify an industry trend or best practice technique that involves restoring corrupt data to a different storage location. In this example, upon identifying the industry trend or best practice technique, preparation module 108 may identify the storage location allocated to store the corrupt management application within computing device 202. Preparation module 108 may then configure restore package 116 to restore the management application to a different storage location within computing device 202.

Additionally or alternatively, preparation module 108 may identify a storage location within another computing device (not illustrated in FIG. 2) to which the management application is to be restored. In one example, preparation module 108 may identify a storage location within another computing device in communication with server 206 in FIG. 2. In another example, preparation module 108 may identify a storage location within another computing device included in an entirely different server domain. Upon identifying the storage location within the other computing device, preparation module 108 may configure restore package 116 to restore the management application to the storage location within the other computing device.

In some examples, preparation module 108 may need to obtain approval for restore package 116 from an administrator in charge of server 206. For example, preparation module 108 may direct server 206 to present various information about restore package 116 to the administrator and then request the administrator's approval for restore package 116 to be used to restore the portion of data implicated by the potential data failure. In one example, the administrator may provide his or her approval for restore package 116 via server 206 without making any modifications to restore package 116. In another example, the administrator may make one or more modifications to restore package 116 prior to providing his or her approval for restore package 116 via server 206.

In some examples, maintenance module 112 may maintain restore package 116 in anticipation of detecting a request to restore the portion of data implicated by the potential data failure. For example, a user of computing device 202 may remain unaware that computing device 202 has suffered the potential data failure for several hours or even days after the fact. In this example, maintenance module 112 may maintain restore package 116 available to computing device 202 in anticipation of receiving a request from the user to restore the portion of data implicated by the potential data failure.

By maintaining restore package 116 in anticipation of receiving a request from the user to restore that portion of data, maintenance module 112 may enable computing device 202 to immediately launch restore package 116 without having to wait for preparation module 108 to prepare restore package 116 in response to a request from the user. Moreover, by enabling the computing device 202 to immediately launch restore package 116 without having to wait for preparation module 108 to prepare restore package 116, maintenance module 112 may help reduce the amount of time needed to restore the data implicated by the potential data failure.

In some examples, after preparation module 108 has prepared restore package 116, restore module 110 may detect request 210 from the user to restore the portion of data implicated by the potential data failure. For example, the user may eventually notice that computing device 202 has suffered the potential data failure (since, e.g., the management application is no longer functioning properly). In this example, upon noticing the potential data failure, the user may initiate request 210 to restore the portion of data implicated by the potential data failure. Computing device 202 may then provide request 210 to server 206 via network 204 to initiate the restore operation.

Figure 5:
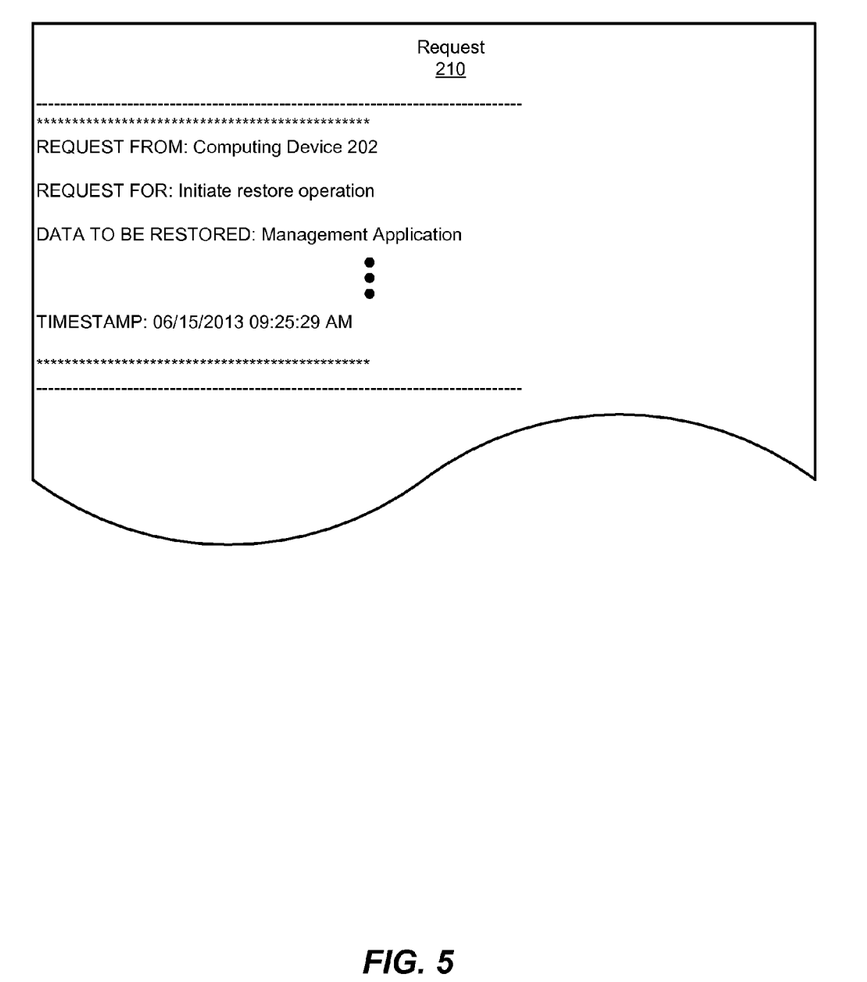
FIG. 5 is an illustration of an exemplary request to initiate a restore operation.

As illustrated in FIG. 5, request 210 may include information that identifies the origin of the request (in this example, "Computing Device 202"), the purpose of the request (in this example, "Initiate restore operation"), the data requested by the request (in this example, "Management Application"), and a timestamp that identifies when the request was initiated by the user (in this example, "06/15/2013" and "09:25:29 AM").

In one example, server 206 may receive request 210 from computing device 202 via network 204. In this example, restore module 110 may, as part of server 206, detect request 210 and then immediately initiate the restore operation by obtaining restore package 116 from maintenance module 112 without having to wait for preparation module 108 to prepare restore package 116. Upon obtaining restore package 116, restore module 110 may direct server 206 to provide restore package 116 to computing device 202 via network 204.

In one example, computing device 202 may receive restore package 116 from server 206 via network 204. In this example, restore module 110 may, as part of computing device 202, detect and launch restore package 116 to restore the portion of data implicated by the potential data failure.

As explained above in connection with method 300 in FIG. 3, a backup and restore agent installed on a computing system may monitor the computing system for evidence of potential data failures. While monitoring the computing system, the backup and restore agent may detect evidence that indicates that the management application is no longer functioning properly. The backup and restore agent may then direct the computing system to provide this evidence to a backup server that stores one or more backup images of the computing system.

The backup server may receive this evidence from the computing system. In response to receiving this evidence, the backup server may identify the most recent backup image of the computing system that includes the management application. The backup server may then immediately prepare a restore package configured to restore the management application to the computing system based at least in part on the most recent backup image. By immediately preparing the restore package instead of waiting for a request from a user of the computing system to restore computing system, the backup server may reduce the amount of time needed to restore the computing system since the restore package is prepared prior to receiving the request from the user.

Figure 6:
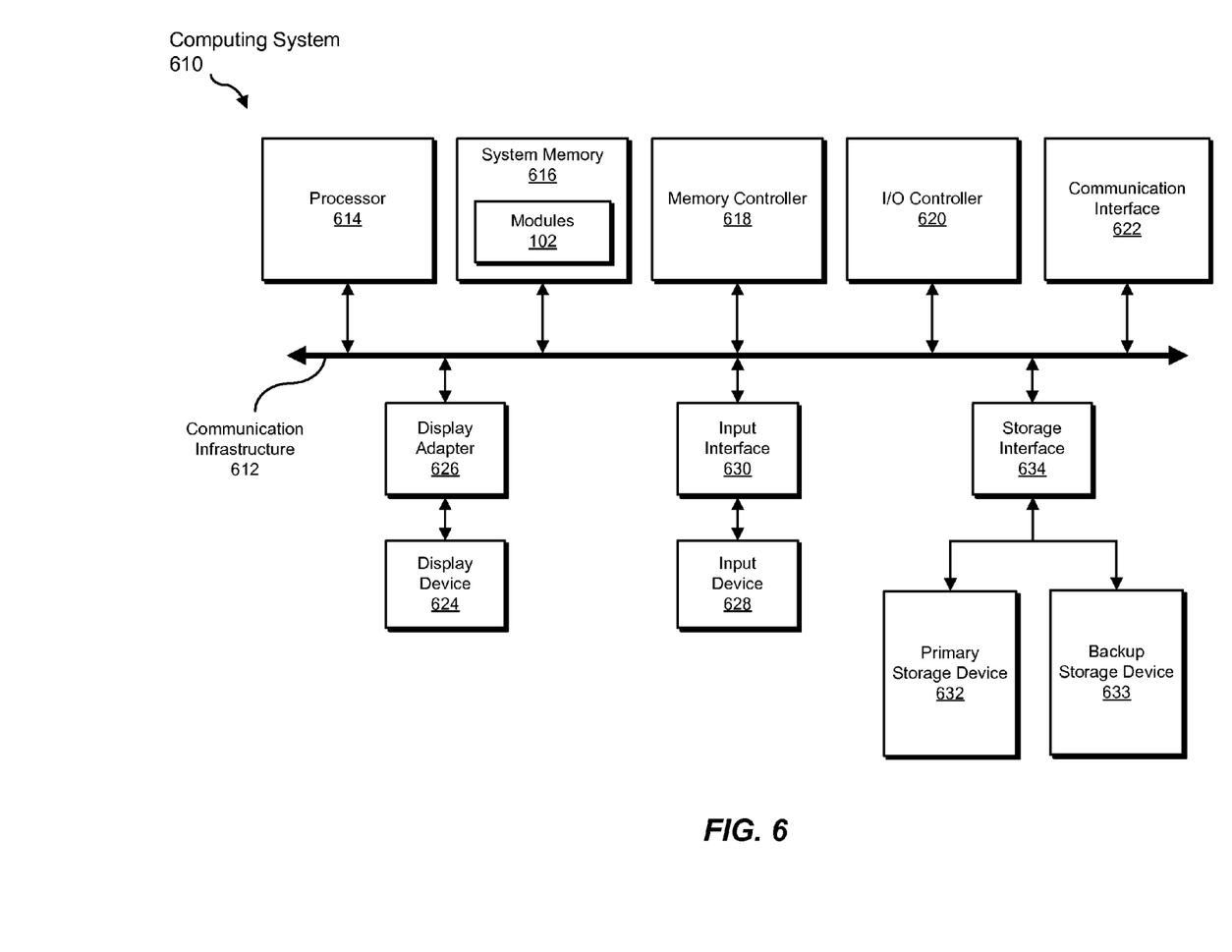
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O)

controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
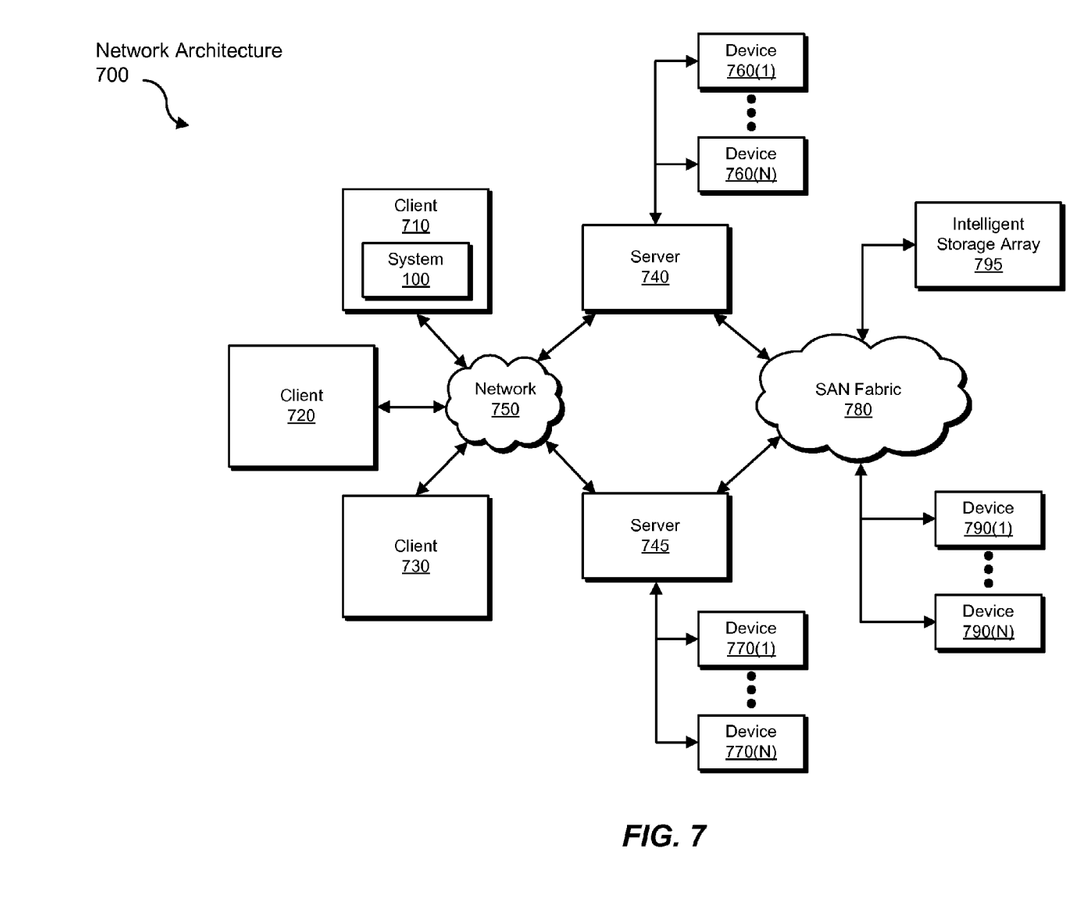
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for predictively preparing restore packages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants).

One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive backup data to be transformed, transform the backup data into a restore package, output a result of the transformation to facilitate restoring data with the restore package, use the result of the transformation to restore the data with the restore package, and store the result of the transformation to complete the process of restoring the data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for predictively preparing restore packages, at least a portion of the method being performed by a computing device comprising at least one processor, the method comprising:
monitoring a computing system for evidence of data failures within the computing system;
while monitoring the computing system, detecting evidence that indicates a data failure within the computing system, wherein the evidence comprises a certain number of specific run-time errors that:
are each identified by a numeric code; and
resulted from failed attempts to access at least a portion of data within the computing system;
determining that the certain number of specific run-time errors exceeds a predetermined threshold indicative of the data failure;
in response to determining that the certain number of specific run-time errors exceeds the predetermined threshold:
predicting a scope of the data failure within the computing system based at least in part on the specific run-time errors, wherein the scope of the data failure implicates the portion of data that caused the failed access attempts resulting in the specific run-time errors;
preparing a restore package configured to restore the portion of data implicated by the predicted scope of the data failure within the computing system, the restore package being derived from the most recently captured backup image that includes the portion of data implicated by the predicted scope of the data failure;
maintaining the restore package in anticipation of receiving, from a user of the computing system, a restore request that initiates a restore operation in connection with the data failure to reduce the amount of time needed to restore the portion of data implicated by the predicted scope of the data failure within the computing system upon receiving the restore request from the user of the computing system.

2. The method of claim 1, further comprising:
detecting the restore request that initiates the restore operation in connection with the data failure;
in response to detecting the restore request that initiates the restore operation, immediately initiating the restore operation to facilitate restoring the portion of data implicated by the predicted scope of the data failure.

3. The method of claim 2, wherein immediately initiating the restore operation to facilitate restoring the portion of data implicated by the predicted scope of the data failure comprises immediately providing the restore package to the computing system to enable the computing system to launch the restore package.

4. The method of claim 1, wherein maintaining the restore package in anticipation of receiving the restore request from the user comprises facilitating launching the restore package without having to prepare the restore package in response to receiving the restore request from the user to initiate the restore operation.

5. The method of claim 1, wherein predicting the scope of the data failure comprises analyzing the evidence that indicates the data failure within the computing system.

6. The method of claim 5, wherein preparing the restore package comprises:
identifying at least one backup image of the computing system that includes the portion of data based at least in part on analyzing the evidence that indicates the data failure;
preparing the restore package based at least in part on the backup image of the computing system that includes the portion of data.

7. The method of claim 6, wherein preparing the restore package based at least in part on the backup image of the computing system comprises configuring the restore package to facilitate restoring the computing system to a previous computing state captured in the backup image.

8. The method of claim 6, wherein preparing the restore package based at least in part on the backup image of the computing system comprises configuring the restore package to facilitate restoring a subset of the data captured in the backup image.

9. The method of claim 1, wherein preparing the restore package comprises configuring the restore package based at least in part on at least one industry trend or best practice technique.

10. The method of claim 9, wherein configuring the restore package based at least in part on the industry trend or best practice technique comprises:
identifying a location allocated to store the portion of data implicated by the data failure within the computing system;
configuring the restore package to restore the portion of data implicated by the data failure to a different location within the computing system.

11. The method of claim 1, wherein monitoring the computing system for evidence of data failures comprises directing a software agent installed on the computing system to monitor the computing system for evidence of data failures.

12. The method of claim 1, wherein detecting the evidence that indicates the data failure comprises detecting evidence of at least one corrupt application installed on the computing system.

13. The method of claim 1, wherein detecting the evidence that indicates the data failure comprises determining that the computing system is offline.

14. A system for predictively preparing restore packages, the system comprising:
a monitoring module, stored in memory, that:
monitors a computing system for evidence of data failures within the computing system;
while monitoring the computing system, detects evidence that indicates a data failure within the computing system, wherein the evidence comprises a certain number of specific run-time errors that:
are each identified by a numeric code; and
resulted from failed attempts to access at least a portion of data within the computing system;
a prediction module, stored in memory, that:
determines that the certain number of specific run-time errors exceeds a predetermined threshold indicative of the data failure;
predicts a scope of the data failure within the computing system based at least in part on the specific run-time errors, wherein the scope of the data failure implicates the portion of data that caused the failed access attempts resulting in the specific run-time errors;

a preparation module, stored in memory, that prepares a restore package configured to restore the portion of data implicated by the predicted scope of the data failure within the computing system, the restore package being derived from the most recently captured backup image that includes the portion of data implicated by the predicted scope of the data failure;

a maintenance module, stored in memory, that maintains the restore package in anticipation of receiving, from a user of the computing system, a restore request that initiates a restore operation in connection with the data failure to reduce the amount of time needed to restore the portion of data implicated by the predicted scope of the data failure within the computing system upon receiving the restore request from the user of the computing system;

at least one physical processor configured to execute the monitoring module, the prediction module, the preparation module, and the maintenance module.

15. The system of claim 14, further comprising a restore module, stored in memory, that:
   detects the restore request that initiates the restore operation in connection with the data failure;
   immediately initiates the restore operation to facilitate restoring the portion of data implicated by the predicted scope of the data failure in response to detecting the restore request that initiates the restore operation.

16. The system of claim 15, wherein the restore module immediately provides the restore package to the computing system to enable the computing system to launch the restore package.

17. The system of claim 14, wherein the preparation module facilitates launching the restore package without having to prepare the restore package in response to the restore request that initiates the restore operation.

18. A non-transitory computer-readable-storage medium comprising one or more computer-executable instructions that, when executed by at least one processor of a computing device, cause the computing device to:
   monitor a computing system for evidence of data failures within the computing system;
   while monitoring the computing system, detect evidence that indicates a data failure within the computing system, wherein the evidence comprises a certain number of specific run-time errors that:
      are each identified by a numeric code; and
      resulted from failed attempts to access at least a portion of data within the computing system;
   determine that the certain number of specific run-time errors exceeds a predetermined threshold indicative of the data failure;
   in response to determining that the certain number of specific run-time errors exceeds the predetermined threshold:
      predict a scope of the data failure within the computing system based at least in part on the specific run-time errors, wherein the scope of the data failure implicates the portion of data that caused the failed access attempts resulting in the specific run-time errors;
      prepare a restore package configured to restore the portion of data implicated by the predicted scope of the data failure within the computing system, the restore package being derived from the most recently captured backup image that includes the portion of data implicated by the predicted scope of the data failure;
   maintain the restore package in anticipation of receiving, from a user of the computing system, a restore request that initiates a restore operation in connection with the data failure to reduce the amount of time needed to restore the portion of data implicated by the predicted scope of the data failure within the computing system upon receiving the restore request from the user of the computing system.

19. The method of claim 1, wherein preparing the restore package comprises:
   searching a set of backup images for the most recently captured backup image that includes the portion of data implicated by the predicted scope of the data failure;
   retrieving the portion of data implicated by the predicted scope of the data failure from the most recently captured backup image that includes the portion of data implicated by the predicted scope of the data failure;
   upon retrieving the portion of data from the most recently captured backup image that includes the portion of data, incorporating the portion of data implicated by the predicted scope of the data failure.

20. The system of claim 14, wherein the preparation module prepares the restore package by:
   searching a set of backup images for the most recently captured backup image that includes the portion of data implicated by the predicted scope of the data failure;
   retrieving the portion of data implicated by the predicted scope of the data failure from the most recently captured backup image that includes the portion of data implicated by the predicted scope of the data failure;
   upon retrieving the portion of data from the most recently captured backup image that includes the portion of data, incorporating the portion of data implicated by the predicted scope of the data failure.

* * * * *